(12) United States Patent
Tan

(10) Patent No.: US 10,558,258 B2
(45) Date of Patent: Feb. 11, 2020

(54) I/O INTERFACE-BASED SIGNAL OUTPUT METHOD AND APPARATUS

(71) Applicant: Huawei Technologies Co., Ltd., Shenzhen (CN)

(72) Inventor: Lijuan Tan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 15/056,379

(22) Filed: Feb. 29, 2016

(65) Prior Publication Data

US 2016/0179187 A1 Jun. 23, 2016

Related U.S. Application Data

(63) Continuation of application No. PCT/CN2014/074948, filed on Apr. 9, 2014.

(30) Foreign Application Priority Data

Aug. 28, 2013 (CN) .......................... 2013 1 0382053

(51) Int. Cl.
*G06F 1/26* (2006.01)
*G06F 1/32* (2019.01)
*G06F 13/36* (2006.01)
*G06F 1/3296* (2019.01)
*G06F 13/362* (2006.01)

(52) U.S. Cl.
CPC .......... *G06F 1/3296* (2013.01); *G06F 1/266* (2013.01); *G06F 13/362* (2013.01)

(58) Field of Classification Search
None
See application file for complete search history.

(56) References Cited

U.S. PATENT DOCUMENTS

| | | | | |
|---|---|---|---|---|
| 5,428,580 A | * | 6/1995 | Kawashima | G11C 5/143 365/201 |
| 2004/0117678 A1 | * | 6/2004 | Soltis, Jr. | G06F 1/206 713/320 |

(Continued)

FOREIGN PATENT DOCUMENTS

| | | |
|---|---|---|
| CN | 101251766 A | 8/2008 |
| CN | 101414748 A | 4/2009 |

(Continued)

OTHER PUBLICATIONS

Partial English Translation and Abstract of Chinese Patent Application No. CN102998614, May 24, 2016, 17 pages.

(Continued)

*Primary Examiner* — Kim Huynh
*Assistant Examiner* — Kevin M Stewart
(74) *Attorney, Agent, or Firm* — Conley Rose, P.C.

(57) ABSTRACT

An input/output (I/O) interface-based signal output method and apparatus. The method includes determining whether a voltage output by a core power supply domain of a first chip is lower than a preset threshold voltage of the first chip, and when the voltage output by the core power supply domain is lower than the threshold voltage, generating a first level signal according to a control function of the first chip over a second chip, where the first level signal is used to enable the second chip to be in an ignoring state after the second chip receives the first level signal, and sending the first level signal to the second chip through an I/O interface, where the ignoring state indicates that the second chip ignores a control signal and a data signal that are sent by the first chip where the method improves stable performance of a chip product.

18 Claims, 10 Drawing Sheets

(56) References Cited

U.S. PATENT DOCUMENTS

| | | | |
|---|---|---|---|
| 2005/0144340 A1 | 6/2005 | Sakai | |
| 2008/0036490 A1 | 2/2008 | Kim et al. | |
| 2008/0256374 A1* | 10/2008 | Harris | G06F 13/16 713/323 |
| 2009/0096484 A1* | 4/2009 | Jao | H03K 3/356182 326/68 |
| 2009/0153210 A1 | 6/2009 | Wang et al. | |
| 2011/0012650 A1* | 1/2011 | Scobie | G06F 1/24 327/143 |
| 2012/0155144 A1* | 6/2012 | Xia | G11C 11/22 365/145 |
| 2015/0043280 A1* | 2/2015 | Pao | G11C 16/225 365/185.18 |

FOREIGN PATENT DOCUMENTS

| | | |
|---|---|---|
| CN | 101739319 A | 6/2010 |
| CN | 102998614 A | 3/2013 |
| CN | 103490757 A | 1/2014 |

OTHER PUBLICATIONS

Partial English Translation and Abstract of Chinese Patent Application No. CN101251766, Mar. 9, 2016, 6 pages.

Partial English Translation and Abstract of Chinese Patent Application No. CN101414748, Mar. 9, 2016, 4 pages.

Partial English Translation and Abstract of Chinese Patent Application No. CN103490757, Mar. 9, 2016, 3 pages.

Foreign Communication From a Counterpart Application, Chinese Application No. 201310382053.X, Chinese Office Action dated Apr. 5, 2016, 11 pages.

Foreign Communication From a Counterpart Application, Chinese Application No. 201310382053.X, Chinese Office Action dated Aug. 8, 2015, 9 pages.

Foreign Communication From a Counterpart Application, PCT Application No. PCT/CN2014/074948, English Translation of International Search Report dated Jul. 17, 2014, 2 pages.

Foreign Communication From a Counterpart Application, PCT Application No. PCT/CN2014/074948, English Translation of Written Opinion dated Jul. 17, 2014, 12 pages.

* cited by examiner

I/O INTERFACE-BASED SIGNAL OUTPUT METHOD AND APPARATUS

CROSS-REFERENCE TO RELATED APPLICATIONS

This application is a continuation of International Application No. PCT/CN2014/074948, filed on Apr. 9, 2014, which claims priority to Chinese Patent Application No. 201310382053.X, filed on Aug. 28, 2013, both of which are hereby incorporated by reference in their entireties.

TECHNICAL FIELD

The present disclosure relates to the field of electronic technologies, and in particular, to an input/output (I/O) interface-based signal output method and apparatus.

BACKGROUND

An I/O interface is generally used for communication between two chips. In an actual communications system, a sending chip and a receiving chip cannot perform complete synchronous processing. A metastable state of the sending chip (the metastable state refers to an unstable state occurring when an I/O power supply is turned on or off) may cause a data writing error or a program running error to the receiving chip. As shown in FIG. 1, when a sending chip has only an I/O interface in an output direction, in order to prevent a metastable state of the sending chip from causing an error to a receiving chip, a weak pull-up resistor or a weak pull-down resistor (a resistance value is about a few tens of kilo-ohms, and whether a weak pull-up resistor or a weak pull-down resistor is selected is determined by a function of the receiving chip) is generally built in an I/O interface for an input direction in the receiving chip. A metastable state of a sending chip can be prevented from causing an error to a receiving chip, by building a weak pull-up resistor or a weak pull-down resistor in an I/O interface of the receiving chip.

When both a sending chip and a receiving chip have a bidirectional I/O interface, in order to prevent respective metastable states of the sending chip and the receiving chip from causing respective errors to the sending chip and the receiving chip, a built-in weak pull-up resistor or a built-in weak pull-down resistor should be disposed for the input directions of both the sending chip and the receiving chip. However, for an actual communications system, with a design of a sending chip used as an example, a weak pull-up resistor or a weak pull-down resistor needs to be built in a sending chip for an input direction in order to prevent a metastable state of a receiving chip from causing an error to the sending chip. However, this does mean that a weak pull-up resistor or a weak pull-down resistor is built in every chip for an input direction. During board design, because it is uncertain whether a weak pull-up resistor or a weak pull-down resistor is built in the receiving chip, it is still necessary to consider an error caused by a metastable state of the sending chip to the input direction of the receiving chip. In order to solve this problem, one pull-up resistor or pull-down resistor is generally connected to a board (whether a pull-up resistor or a pull-down resistor is connected is determined by a function of an input end of the receiving chip). As shown in FIG. 2, a weak pull-up resistor or a weak pull-down resistor is built in both a sending chip and a receiving chip, and a pull-up resistor or a pull-down resistor is also disposed on a board. Whether a built-in weak pull-up resistor or a built-in weak pull-down resistor is selected for the sending chip is determined by a function of the sending chip, and whether a pull-up resistor or a pull-down resistor is disposed on the board is determined by a function of the receiving chip.

According to an I/O interface-based signal output method in the prior art, even if a weak pull-up resistor or a weak pull-down resistor is disposed in both a sending chip and a receiving chip, and a pull-up resistor or a pull-down resistor is also integrated on a board, a problem of misoperations still exists. With a sending chip used as an example, all control signals for an I/O interface are generated by a core power supply domain. Even though a power supply of a receiving chip and an I/O power supply of a sending chip have been stable, when a core power supply of the sending chip is turned on or off, the I/O interface still collects some abnormal data from the core power supply domain and sends the abnormal data to the receiving chip, thereby causing some mis-operations on the receiving chip. These mis-operations affect a key control signal of the receiving chip, for example, a chip select (CS) signal/a chip select with low level (CSn) signal. Abnormal data, collected by the receiving chip when a core power supply of the receiving chip is turned on or off, may also cause the same problem to the sending chip.

SUMMARY

Embodiments of the present disclosure provide an I/O interface-based signal output method and apparatus, which are used to solve a problem that abnormal data output when a core power supply of a chip is turned on or off causes a mis-operation to a peer chip, thereby improving stable performance of a chip product.

To solve the foregoing technical problem, the embodiments of the present disclosure provide the following technical solutions.

According to a first aspect, an embodiment of the present disclosure provides an I/O interface-based signal output method, where the I/O interface is disposed in a first chip, a core power supply domain is provided for the first chip, and the first chip is communicatively connected to a second chip, and the signal output method includes determining whether a voltage output by the core power supply domain is lower than a preset threshold voltage of the first chip. If the voltage output by the core power supply domain is lower than the threshold voltage, generating a first level signal according to a control function of the first chip over the second chip, where the first level signal is used to enable the second chip to be in an ignoring state after the second chip receives the first level signal, and sending the first level signal to the second chip through the I/O interface such that the second chip enters the ignoring state, where after entering the ignoring state, the second chip ignores a control signal and a data signal that are sent by the first chip.

With reference to the first aspect, in a first possible implementation manner of the first aspect, the generating a first level signal according to a control function of the first chip over the second chip includes generating the first level signal using a pull-up resistor or pull-down resistor that is disposed on the I/O interface.

With reference to the first possible implementation manner of the first aspect, in a second possible implementation manner of the first aspect, the first level signal is one signal of a first high level signal and a first low level signal, and the generating the first level signal using a pull-up resistor or pull-down resistor that is disposed on the I/O interface includes if a pull-up resistor is disposed on the I/O interface, outputting, using a resistor control circuit, a pull-up control (PUC) signal to the pull-up resistor in order to obtain the first high level signal using the pull-up resistor, and if a pull-down resistor is disposed on the I/O interface, outputting, using the resistor control circuit, a pull-down control (PDC) signal to the pull-down resistor in order to obtain the first low level signal using the pull-down resistor.

With reference to the first aspect, in a third possible implementation manner of the first aspect, the first level signal is one signal of a first high level signal and a first low level signal, and if a pull-up resistor and a pull-down resistor are disposed on the I/O interface of the first chip, the generating a first level signal according to a control function of the first chip over the second chip includes generating, using the core power supply domain, a high low control-core (HLC-Core) signal corresponding to the control function of the first chip over the second chip, performing level conversion on the HLC-Core signal to obtain a high low control (HLC) signal, and generating, using a bus hold circuit, the first level signal according to the HLC signal, where if the HLC signal indicates a high level, the bus hold circuit outputs the first high level signal, and if the HLC signal indicates a low level, the bus hold circuit outputs the first low level signal.

With reference to the first aspect, in a fourth possible implementation manner of the first aspect, the first level signal is one signal of a first high level signal and a first low level signal, and if a pull-up resistor and a pull-down resistor are disposed on the I/O interface of the first chip, the generating a first level signal according to a control function of the first chip over the second chip includes, according to the control function of the first chip over the second chip, if a PUC signal is generated using a resistor control circuit, outputting the PUC signal to the pull-up resistor such that the pull-up resistor outputs the first high level signal, and according to the control function of the first chip over the second chip, if a PDC signal is generated using the resistor control circuit, outputting the PDC signal to the pull-down resistor such that the pull-down resistor outputs the first low level signal.

With reference to the first aspect, in a fifth possible implementation manner of the first aspect, the generating a first level signal according to a control function of the first chip over the second chip includes sending a hold signal, acquiring a first signal output by the I/O interface before the hold signal is sent, and generating, for the second chip in response to the hold signal, a second signal whose level is kept reverse to a level of the first signal, where the second signal is the generated first level signal.

With reference to the first aspect or the first, second, third, fourth, or fifth possible implementation manner of the first aspect, in a sixth possible implementation manner of the first aspect, if the voltage output by the core power supply domain is higher than or equal to the threshold voltage, the signal output method further includes determining whether a voltage output by an I/O power supply domain is in an unstable working state. If the voltage output by the I/O power supply domain is in the unstable working state, generating a second level signal according to a pull-up resistor and/or a pull-down resistor that are/is disposed on the I/O interface, where the second level signal is used to enable the second chip to be in the ignoring state after the second chip receives the second level signal, and sending the generated second level signal to the second chip, so that the second chip enters the ignoring state, where after entering the ignoring state, the second chip ignores the control signal and the data signal that are sent by the first chip.

With reference to the sixth possible implementation manner of the first aspect, in a seventh possible implementation manner of the first aspect, the second level signal is one signal of a second high level signal and a second low level signal, and the generating a second level signal according to a pull-up resistor and/or a pull-down resistor that are/is disposed on the I/O interface includes, if a pull-up resistor is disposed on the I/O interface, outputting, using a resistor control circuit, a PUC signal to the pull-up resistor in order to obtain the second high level signal using the pull-up resistor, and if a pull-down resistor is disposed on the I/O interface, outputting, using the resistor control circuit, a PDC signal to the pull-down resistor in order to obtain the second low level signal using the pull-down resistor.

With reference to the sixth or seventh possible implementation manner of the first aspect, in an eighth possible implementation manner of the first aspect, if the voltage output by the I/O power supply domain is in a stable working state, the signal output method further includes, if a pull-down (PD) signal is output in the core power supply domain, triggering, according to the PD signal, a PDC signal output by a resistor control circuit such that the PDC signal controls the pull-down resistor to be in a non-working state, and if a pull-up (PU) signal is output in the core power supply domain, triggering, according to the PU signal, a PUC signal output by the resistor control circuit such that the PUC signal controls the pull-up resistor to be in a non-working state.

According to a second aspect, an embodiment of the present disclosure further provides an I/O interface-based signal output apparatus, where the I/O interface is disposed in a first chip, a core power supply domain is provided for the first chip, and the first chip is communicatively connected to a second chip, and the signal output apparatus includes a core power supply detecting module, a level acquiring module, and a signal output module, where the core power supply detecting module is configured to determine whether a voltage output by the core power supply domain is lower than a preset threshold voltage of the first chip. The level acquiring module is configured to, if the voltage output by the core power supply domain is lower than the threshold voltage, generate a first level signal according to a control function of the first chip over the second chip, where the first level signal is used to enable the second chip to be in an ignoring state after the second chip receives the first level signal, and the signal output module is configured to acquire the first level signal from the level acquiring module, and send the first level signal to the second chip through the I/O interface such that the second chip enters the ignoring state, where after entering the ignoring state, the second chip ignores a control signal and a data signal that are sent by the first chip.

With reference to the second aspect, in a first possible implementation manner of the second aspect, the level acquiring module is further configured to generate the first level signal using a pull-up resistor or pull-down resistor that is disposed on the I/O interface.

With reference to the first possible implementation manner of the second aspect, in a second possible implementation manner of the second aspect, the first level signal is one signal of a first high level signal and a first low level signal, and the level acquiring module includes a first pull-up submodule configured to, if a pull-up resistor is disposed on the I/O interface, output, using a resistor control circuit, a PUC signal to the pull-up resistor in order to obtain the first high level signal using the pull-up resistor, and a first pull-down submodule configured to, if a pull-down resistor is disposed on the I/O interface, output, using the resistor control circuit, a PDC signal to the pull-down resistor in order to obtain the first low level signal using the pull-down resistor.

With reference to the second aspect, in a third possible implementation manner of the second aspect, the first level signal is one signal of a first high level signal and a first low level signal, and if a pull-up resistor and a pull-down resistor are disposed on the I/O interface of the first chip, the level acquiring module includes a control signal submodule configured to generate, using the core power supply domain, a HLC-Core signal corresponding to the control function of the first chip over the second chip. A level converting submodule configured to perform level conversion on the HLC-Core signal to obtain a HLC signal, and a bus hold submodule configured to generate, using a bus hold circuit, the first level signal according to the HLC signal, where if the HLC signal indicates a high level, the bus hold circuit outputs the first high level signal, and if the HLC signal indicates a low level, the bus hold circuit outputs the first low level signal.

With reference to the second aspect, in a fourth possible implementation manner of the second aspect, the first level signal is one signal of a first high level signal and a first low level signal, and if a pull-up resistor and a pull-down resistor are disposed on the I/O interface of the first chip, the level acquiring module includes a PUC generating submodule configured to, according to the control function of the first chip over the second chip, if a PUC signal is generated using a resistor control circuit, output the PUC signal to the pull-up resistor such that the pull-up resistor outputs the first high level signal, and a PDC generating submodule configured to, according to the control function of the first chip over the second chip, if a PDC signal is generated using the resistor control circuit, output the PDC signal to the pull-down resistor such that the pull-down resistor outputs the first low level signal.

With reference to the second aspect, in a fifth possible implementation manner of the second aspect, the level acquiring module includes a hold submodule configured to send a hold signal, a first signal acquiring submodule configured to acquire a first signal output by the I/O interface before the hold signal is sent, and a second signal acquiring submodule configured to generate, for the second chip in response to the hold signal, a second signal whose level is kept reverse to a level of the first signal, where the second signal is the generated first level signal.

With reference to the second aspect or the first, second, third, fourth, or fifth possible implementation manner of the second aspect, in a sixth possible implementation manner of the second aspect, if the voltage output by the core power supply domain is higher than or equal to the threshold voltage, the signal output apparatus further includes an I/O power supply detecting module configured to determine whether a voltage output by an I/O power supply domain is in an unstable working state, the level acquiring module is further configured to, if the voltage output by the I/O power supply domain is in the unstable working state, generate a second level signal according to a pull-up resistor and/or a pull-down resistor that are/is disposed on the I/O interface, where the second level signal is used to enable the second chip to be in the ignoring state after the second chip receives the second level signal, and the signal output module is further configured to send the generated second level signal to the second chip such that when the second chip is in the ignoring state, the second chip ignores the control signal and the data signal that are sent by the first chip.

With reference to the sixth possible implementation manner of the second aspect, in a seventh possible implementation manner of the second aspect, the level acquiring module includes a second pull-up submodule configured to, if a pull-up resistor is disposed on the I/O interface, output, using a resistor control circuit, a PUC signal to the pull-up resistor in order to obtain a second high level signal using the pull-up resistor, and a second pull-down submodule configured to, if a pull-down resistor is disposed on the I/O interface, output, using the resistor control circuit, a PDC signal to the pull-down resistor in order to obtain a second low level signal using the pull-down resistor.

With reference to the sixth or seventh possible implementation manner of the second aspect, in an eighth possible implementation manner of the second aspect, if the voltage output by the I/O power supply domain is in a stable working state, the signal output apparatus further includes a PD generating module configured to, if a PD signal is output in the core power supply domain, trigger, according to the PD signal, a PDC signal output by a resistor control circuit such that the PDC signal controls the pull-down resistor to be in a non-working state, and a PU generating module configured to, if a PU signal is output in the core power supply domain, trigger, according to the PU signal, a PUC signal output by the resistor control circuit such that the PUC signal controls the pull-up resistor to be in a non-working state.

As can be seen from the foregoing technical solutions, the embodiments of the present disclosure have the following advantages.

In the embodiments of the present disclosure, first, a voltage value output by a core power supply domain is compared with a preset threshold voltage of a first chip. When the voltage output by the core power supply domain is lower than the threshold voltage, it may be learnt that a core power supply is still unstable and the first chip is abnormal. Then, a first level signal is generated according to a control function of the first chip over a second chip, where the first level signal is used to enable the second chip to be in an ignoring state after the second chip receives the first level signal. Finally, the first level signal is sent to the second chip through an I/O interface. In the embodiments of the present disclosure, when a voltage output by a core power supply domain is lower than a threshold voltage, a first level signal is generated according to a control function of a first chip over a second chip. The first level signal output by the first chip can enable the second chip to be in an ignoring state. After receiving the first level signal, the second chip enters the ignoring state. After entering the ignoring state, the second chip ignores a control signal and a data signal that are sent by the first chip, thereby preventing a mis-operation caused by the first chip to the second chip.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person skilled in the art may still derive other drawings from these accompanying drawings.

DESCRIPTION OF EMBODIMENTS

Embodiments of the present disclosure provide an I/O interface-based signal output method and apparatus, which are used to solve a problem that abnormal data output when a core power supply of a chip is turned on or off causes a mis-operation to a peer chip, thereby improving stable performance of a chip product.

To make the objectives, features and advantages of the present disclosure more obvious and understandable, the following clearly describes the technical solutions in the embodiments of the present disclosure with reference to the accompanying drawings in the embodiments of the present disclosure. The following described embodiments are merely some rather than all embodiments of the present disclosure. All other embodiments obtained by a person skilled in the art based on the embodiments of the present disclosure shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the embodiments of the present disclosure. Moreover, the terms "include", "provided with" and any other variants mean to cover a non-exclusive inclusion such that a process, method, system, product, or device that includes a series of units is not necessarily limited to those units, but may include other units not expressly listed or inherent to such a process, method, system, product, or device.

The following provides detailed description.

Figure 1:
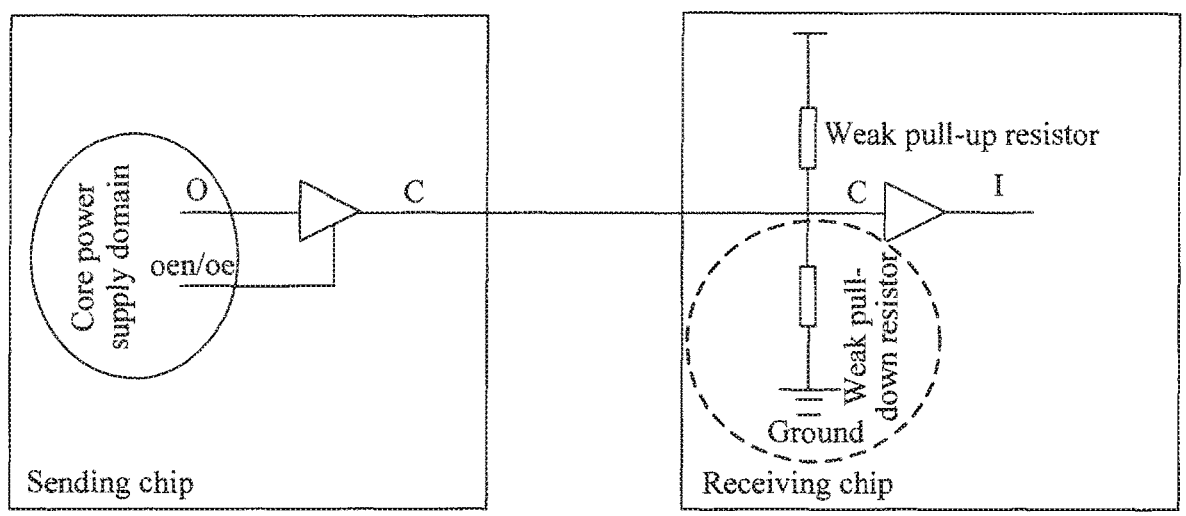
FIG. 1 is a schematic diagram of an I/O interface-based signal output method.
Figure 2:
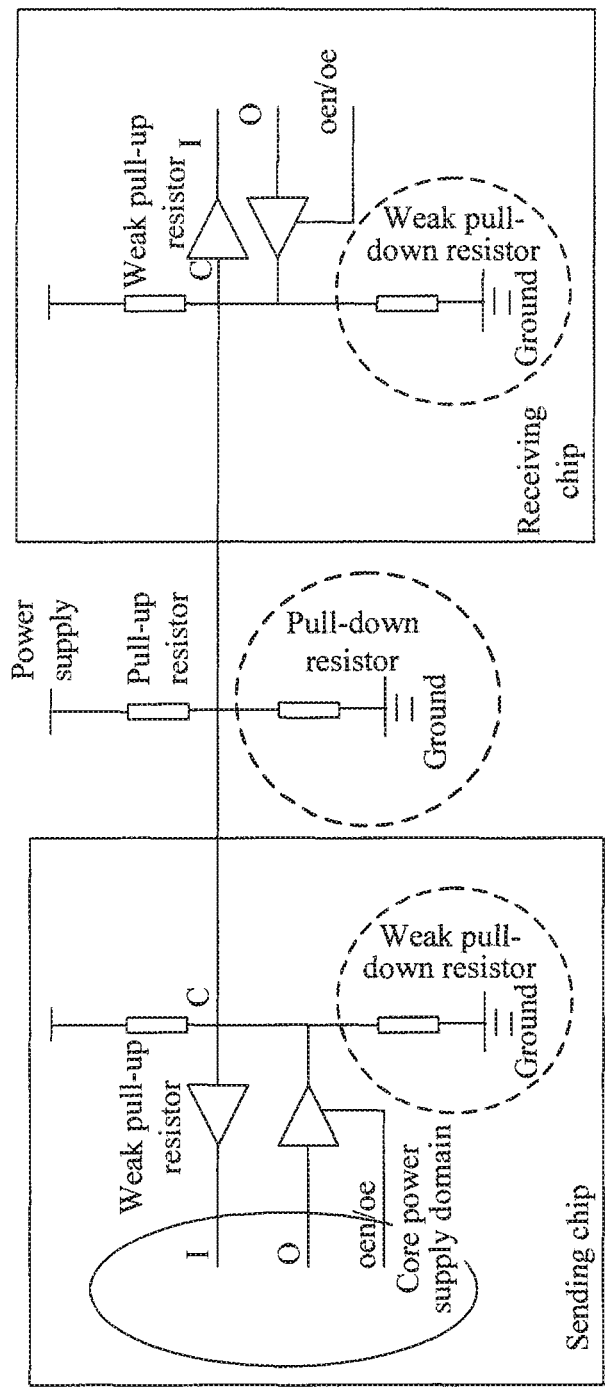
FIG. 2 is a schematic diagram of another I/O interface-based signal output method.
Figure 3:
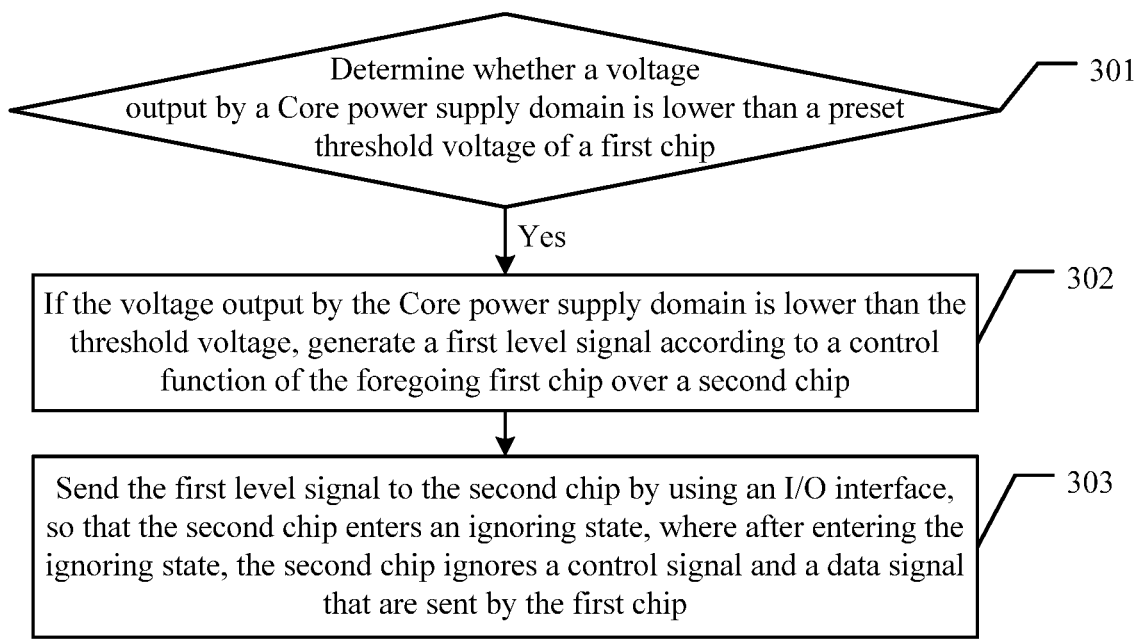
FIG. 3 is a schematic block flowchart of an I/O interface-based signal output method according to an embodiment of the present disclosure.

An embodiment of the present disclosure provides an I/O interface-based signal output method, where the signal output method is applied in a first chip and the I/O interface is disposed in the first chip, a core power supply domain is provided for the first chip, and the first chip is communicatively connected to a second chip. As shown in FIG. 3, the signal output method may further include the following steps.

Step 301: Determine whether a voltage output by a core power supply domain is lower than a preset threshold voltage of a first chip.

In this embodiment of the present disclosure, the first chip is communicatively connected to the second chip. Further, both the first chip and the second chip may be disposed on one board, and the first chip and the second chip communicate through an I/O interface. The I/O interface is disposed on both the first chip and the second chip. The I/O interface described in this embodiment of the present disclosure may further refer to an I/O interface in an output direction, an I/O interface in an input direction, or a bidirectional I/O interface.

In this embodiment of the present disclosure, the first chip is used as an example for description. The I/O interface of the first chip has two power supply domains an I/O power supply domain and a core power supply domain. The I/O interface can work normally only when both power supplies (an I/O power supply and a core power supply) are in a stable working state. In this embodiment of the present disclosure, in order to determine whether the core power supply is stable, a threshold voltage may be set for the first chip. The threshold voltage refers to a voltage value when the first chip can reach a normal working state, and a value of the threshold voltage is related to a manufacturing technique and design of the first chip. A specific magnitude of the value is not further limited in this embodiment of the present disclosure. It may be understood that, in this embodiment of the present disclosure, two power supply domains (a core power supply and an I/O power supply) are also disposed for the I/O interface of the second chip, and in order to determine whether the core power supply of the second chip is stable, a threshold voltage may also be set for the second chip, where a value of the threshold voltage is determined by a specific application scenario. For example, the core power supply may be a power supply required for the first chip to complete chip processing functions. The core power supply domain may be a part for the chip to implement the processing functions, and the I/O power supply may be different from the core power supply.

In some embodiments of the present disclosure, the voltage output by the core power supply domain is first acquired, and a numerical value of the voltage output by the core power supply domain is compared with that of the threshold voltage of the first chip. In an actual application, a core power supply detection circuit may be further disposed in the first chip, and the core power supply detection circuit detects a voltage value of a core power supply. If the voltage output by the core power supply domain is lower than the threshold voltage, it indicates that the core power supply is still unstable and the first chip is abnormal. If the core power supply detection circuit detects that the voltage output by the core power supply domain is higher than or equal to the threshold voltage, it indicates that the first chip is in a stable working state.

It should be noted that the first chip and the second chip that are described in this embodiment of the present disclosure refer to two chips disposed on a board, where "first" and "second" do not indicate sequential or logical meanings, and are merely used to distinguish between the two chips. In an actual application, the first chip may further refer to a sending chip disposed on a board and the second chip may further refer to a receiving chip disposed on the board, and vice versa, which is herein for description only rather than a limitation. Moreover, the first chip is configured to implement control over the second chip, and the first chip sends a data signal or a control signal to the second chip. In this embodiment of the present disclosure, for ease of description, the I/O interface of the first chip is that in an output direction, and the I/O interface of the second chip is that in an input direction, and certainly, the description may also be given in a reverse or similar manner, which is for description only herein.

Step 302: If the voltage output by the core power supply domain is lower than the threshold voltage, generate a first level signal according to a control function of the first chip over the second chip.

The first level signal is used to enable the second chip to be in an ignoring state after the second chip receives the first level signal.

Furthermore, the first level signal is one signal of a first high level signal and a first low level signal.

It should be noted that, that the second chip is in the ignoring state means that the second chip ignores, after receiving the first level signal sent by the first chip, a control signal and a data signal that are sent by the first chip, which can prevent a mis-operation that is caused, to the second chip, by abnormal data sent by the core power supply domain of the first chip in an unstable working state. In some embodiments of the present disclosure, that the second chip is in the ignoring state may further mean that the second chip enters a non-working state after receiving the first level signal sent by the first chip, which can also prevent a mis-operation that is caused, to the second chip, by abnormal data sent by the core power supply domain of the first chip in an unstable working state.

In this embodiment of the present disclosure, when the voltage output by the core power supply domain is lower than the threshold voltage, it may be determined that the core power supply of the first chip is still unstable and the first chip is abnormal. In order to prevent the first chip from outputting abnormal data at this time, in the method used in this embodiment of the present disclosure, the first level signal is generated according to the control function of the first chip over the second chip. The first level signal is used to enable the second chip to be in the ignoring state after the second chip receives the first level signal. That is, in this embodiment of the present disclosure, the first level signal generated for the second chip is a signal with a stable level. Moreover, the first level signal functions to enable the second chip to be in the ignoring state after the second chip receives the first level signal, that is, the second chip ignores a control signal and a data signal that are sent by the first chip. Therefore, it can be prevented that a misoperation is caused by a first chip to a second chip because abnormal data is output when a core power supply is turned on or off, thereby improving performance of a chip product.

In this embodiment of the present disclosure, the first level signal that is generated according to the control function of the first chip over the second chip may be a first high level signal, or may be a first low level signal, that is, whether a level of the first level signal generated for the second chip is high or low is determined by the control function of the first chip over the second chip. It should be noted that, in this embodiment of the present disclosure, the first chip is configured to implement control over the second chip, and the first chip sends a data signal or a control signal to the second chip.

Next, the control of the first chip over the second chip is described using an example. For example, the control function of the first chip over the second chip is that the first chip controls, by sending a high level signal to the second chip, the second chip to enter a working state. In other words, when the first chip sends a low level signal to the second chip, the second chip does not enter the working state, which is equivalent that the second chip is not controlled by the first chip. For another example, the control function of the first chip over the second chip may be that the first controls, by sending a low level signal to the second chip, the second chip to enter a working state. In other words, when the first chip sends a high level signal to the second chip, the second chip does not enter the working state, which is equivalent that the second chip is not controlled by the first chip.

In some embodiments of the present disclosure, a pull-up resistor and/or a pull-down resistor may be integrated on the I/O interface of the first chip. It should be noted that integrating a pull-up resistor and/or a pull-down resistor on the I/O interface of the first chip may further be implemented in the following three manners: 1. Integrating a pull-up resistor on the I/O interface of the first chip, 2. Integrating a pull-down resistor on the I/O interface of the first chip, and 3. Integrating a pull-up resistor and a pull-down resistor on the I/O interface of the first chip. Furthermore, a resistance value of the pull-up resistor or pull-down resistor that is integrated on the I/O interface is at a kilo-ohm level. Moreover, the pull-up resistor may implement control over a pull-up function, and the pull-down resistor may implement control over a pull-down function. Whether a pull-up resistor or a pull-down resistor is further integrated is determined by the control function of the first chip over the second chip.

In some embodiments of the present disclosure, in step 302, the generating a first level signal according to a control function of the first chip over the second chip may further include generating the first level signal using a pull-up resistor or pull-down resistor that is disposed on the I/O interface.

Further, when the first level signal is one signal of a first high level signal and a first low level signal, the generating the first level signal using a pull-up resistor or pull-down resistor that is disposed on the I/O interface includes, if a pull-up resistor is disposed on the I/O interface, outputting, using a resistor control circuit, a PUC signal to the pull-up resistor in order to obtain the first high level signal using the pull-up resistor; and if a pull-down resistor is disposed on the I/O interface, outputting, using the resistor control circuit, a PDC signal to the pull-down resistor in order to obtain the first low level signal using the pull-down resistor.

Integrating a pull-up resistor and/or a pull-down resistor on the I/O interface of the first chip can solve a misoperation caused by instability of the core power supply domain of the first chip to the second chip, eliminate a misoperation caused by a metastable state of the first chip to the second chip, and also solve a misoperation caused by a metastable state of the second chip to the first chip in an input direction of the first chip. Next, that a pull-up resistor and/or a pull-down resistor are/is integrated on the I/O interface of the first chip is described in detail using the subsequent embodiments.

After the control function of the first chip over the second chip is learned, in this embodiment of the present disclosure, the generating a first level signal according to a control function of the first chip over the second chip may be implemented in multiple manners. In some embodiments of the present disclosure, one implementation manner for the generating a first level signal according to a control function of the first chip over the second chip may include, if the control function of the first chip over the second chip is controlling, using a high level signal, the second chip to enter a working state, disposing a pull-down resistor on the I/O interface of the first chip, and generating a first low level signal for the second chip according to the disposed pull-down resistor.

Because the control function of the first chip over the second chip is controlling, using a high level signal, the foregoing second chip to enter a working state, a pull-down resistor is disposed on the I/O interface of the first chip, and a first low level signal is generated according to the disposed pull-down resistor. The generated first low level signal can enable the second chip to be in the ignoring state after the second chip receives the first low level signal. In this case, the first low level signal is output to the second chip when the core power supply of the first chip is turned on or off. The first low level signal enables the second chip to be in the ignoring state, that is, the second chip ignores a control signal or a data signal that is sent by the first chip, thereby preventing a misoperation of the first chip on the second chip.

It should be noted that, after the voltage output by the core power supply domain is detected, when the voltage output by the core power supply domain is lower than the threshold voltage, in an actual application, the generating a first low level signal according to the disposed pull-down resistor may be further implemented using a bus hold circuit. For example, a core power supply detection circuit detects a voltage value of the core power supply, and sends a hold signal once the voltage output by the core power supply domain is lower than the threshold voltage of the first chip in order to instruct the bus hold circuit to start. When it is determined that the resistor integrated on the I/O interface is a pull-down resistor, the bus hold circuit uses an I/O power supply to output the first low level signal. It should be noted that, when the control function of the first chip over the second chip is controlling, using a high level signal, the second chip to enter a working state, the bus hold circuit is configured to use, when the core power supply is unstable, the I/O power supply to output the first low level signal to the second chip. In this case, after receiving the first low level signal, the second chip enters the ignoring state, and ignores a control signal and a data signal that are sent by the first chip, thereby preventing a misoperation of the first chip on the second chip.

In addition, after the voltage output by the core power supply domain is detected, when the voltage output by the core power supply domain is lower than the threshold voltage, in an actual application, the generating a first low level signal according to the disposed pull-down resistor may also be implemented using a resistor control circuit. For example, a core power supply detection circuit detects a voltage value of the core power supply. Once the voltage output by the core power supply domain is lower than the threshold voltage of the first chip, a PDC signal is output using the resistor control circuit. The PDC signal is output to the disposed pull-down resistor, and the pull-down resistor outputs the first low level signal. It should be noted that, when the control function of the first chip over the second chip is controlling, using a high level signal, the second chip to enter a working state, the resistor control circuit is configured to output the PDC signal when the core power supply is unstable. The PDC signal is output to the pull-down resistor, and the pull-down resistor outputs the first low level signal. In this case, after receiving the first low level signal, the second chip enters the ignoring state, and ignores a control signal and a data signal that are sent by the first chip, thereby preventing a misoperation of the first chip on the second chip.

In some other embodiments of the present disclosure, one implementation manner for the generating a first level signal according to a control function of the first chip over the second chip may include, if the control function of the foregoing first chip over the second chip is controlling, using a low level signal, the second chip to enter a working state, disposing a pull-up resistor on the I/O interface of the first chip, and generating a first high level signal according to the disposed pull-up resistor.

Because the control function of the first chip over the second chip is controlling, using a low level signal, the second chip to enter a working state, a pull-up resistor may be disposed on the I/O interface of the first chip, and a first high level signal is generated according to the disposed pull-up resistor. The generated first high level signal can enable the second chip to be in the ignoring state after the second chip receives the first high level signal. In this case, the first high level signal instead of abnormal data is output to the second chip when the core power supply of the first chip is turned on or off. The first high level signal enables the second chip to be in the ignoring state, that is, the second chip ignores a control signal and a data signal that are sent by the first chip, thereby preventing a misoperation of the first chip on the second chip.

It should be noted that, after the voltage output by the core power supply domain is detected, when the voltage output by the core power supply domain is lower than the threshold voltage, in an actual application, the generating a first high level signal according to the disposed pull-up resistor may be further implemented using a bus hold circuit. For example, a core power supply detection circuit detects a voltage value of the core power supply, and sends a hold signal once the voltage output by the core power supply domain is lower than the threshold voltage of the first chip in order to instruct the bus hold circuit to start. When it is determined that the resistor integrated on the I/O interface is a pull-up resistor, the bus hold circuit uses an I/O power supply to output the first high level signal. It should be noted that, when the control function of the first chip over the second chip is controlling, using a low level signal, the second chip to enter a working state, the bus hold circuit is configured to use, when the core power supply is unstable, the I/O power supply to output the first high level signal to the second chip. In this case, after receiving the first high level signal, the second chip enters the ignoring state, and ignores a control signal and a data signal that are sent by the first chip, thereby preventing a misoperation of the first chip on the second chip.

In addition, after the voltage output by the core power supply domain is detected, when the voltage output by the core power supply domain is lower than the threshold voltage, in an actual application, the generating a first high level signal according to the disposed pull-up resistor may also be implemented using a resistor control circuit. For example, a core power supply detection circuit detects a voltage value of the core power supply. Once the voltage output by the core power supply domain is lower than the threshold voltage of the first chip, a PUC signal is output using the resistor control circuit. The PUC signal is output to the disposed pull-up resistor, and the pull-up resistor outputs the first high level signal. It should be noted that, when the control function of the first chip over the second chip is controlling, using a low level signal, the second chip to enter a working state, the resistor control circuit is configured to output the PUC signal when the core power supply is unstable. The PUC signal is output to the pull-up resistor, and the pull-up resistor outputs the first high level signal. In this case, after receiving the first high level signal, the second chip enters the ignoring state, and ignores a control signal and a data signal that are sent by the first chip, thereby preventing a misoperation of the first chip on the second chip.

In some other embodiments of the present disclosure, the first level signal is one signal of a first high level signal and a first low level signal, and if a pull-up resistor and a pull-down resistor are disposed on the I/O interface of the first chip, one implementation manner of the generating a first level signal for the second chip according to a control function of the first chip over the second chip in step 302 may include, generating, using the core power supply domain, a HLC-Core signal corresponding to the control function of the first chip over the second chip, performing level conversion on the HLC-Core signal to obtain a HLC signal and generating, using a bus hold circuit, the first level signal according to the HLC signal, where if the HLC signal indicates a high level, the bus hold circuit outputs the first high level signal, and if the HLC signal indicates a low level, the bus hold circuit outputs the first low level signal.

It should be noted that, if a pull-up resistor and a pull-down resistor are integrated on the I/O interface, the first level signal is generated according to the HLC-Core signal output in the core power supply domain. Furthermore, according to an I/O power supply domain, level conversion may be performed on the HLC-Core signal output in the core power supply domain, to obtain the HLC signal. If the HLC signal indicates a high level, the bus hold circuit outputs the first high level signal, and if the HLC signal indicates a low level, the first low level signal is output to the second chip. It should be noted that the bus hold circuit is configured to output, when the core power supply is unstable, the first level signal to the second chip according to the level indicated by the HLC signal. The second chip ignores a control signal and a data signal that are sent by the first chip, thereby preventing a misoperation of the first chip on the second chip.

In some other embodiments of the present disclosure, the first level signal is one signal of a first high level signal and a first low level signal, and if a pull-up resistor and a pull-down resistor are disposed on the I/O interface of the first chip, the generating a first level signal according to a control function of the first chip over the second chip in step 302 may further include, according to the control function of the first chip over the second chip, if a PUC signal is generated using a resistor control circuit, outputting the PUC signal to the pull-up resistor such that the pull-up resistor outputs the first high level signal, and according to the control function of the first chip over the second chip, if a PDC signal is generated using the resistor control circuit, outputting the PDC signal to the pull-down resistor such that the pull-down resistor outputs the first low level signal.

It should be noted that, if a pull-up resistor and a pull-down resistor are integrated on the I/O interface, whether a high level or a low level should be output cannot be determined by an resistor integrated on the I/O interface, but still needs to be determined according to the control function of the first chip over the second chip. Furthermore, the resistor control circuit determines, according to the control function of the first chip over the second chip, whether to output a PUC signal or a PDC signal.

It should be noted that, after the voltage output by the core power supply domain is detected, when the voltage output by the core power supply domain is lower than the threshold voltage, in this embodiment of the present disclosure, the generating a first level signal according to a function of the first chip over the second chip may also be implemented in another manner, for example, sending a hold signal, acquiring a first signal output by the I/O interface before the hold signal is sent, and generating, for the second chip in response to the hold signal, a second signal whose level is kept reverse to a level of the first signal, where the second signal is the generated first level signal. Further, this may be implemented using bus hold circuit. The bus hold circuit outputs a signal whose level is kept reverse to a level of a signal output by the I/O interface before the hold signal is sent. That is, when detecting the hold signal, the bus hold circuit reverses a value of a level that is output by the I/O interface at the time when the hold signal is detected, and directly outputs the reverse value in an I/O power supply domain. If 0 (that is, a low level) is output at the time when the hold signal is detected, the first high level signal is generated for the second chip. If 1 (that is, a high level) is output at the time when the hold signal is detected, the first low level signal is generated for the second chip.

Step 303: Send the first level signal to the second chip using the I/O interface such that the second chip enters an ignoring state, where after entering the ignoring state, the second chip ignores a control signal and a data signal that are sent by the first chip.

In this embodiment of the present disclosure, after being generated in step 302, the first level signal is sent to the second chip through the I/O interface. The first level signal can enable the second chip to be in the ignoring state. After receiving the first level signal sent by the first chip, the second chip enters the ignoring state. After entering the ignoring state, the second chip ignores the control signal and the data signal that are sent by the first chip.

It should be noted that, if the voltage output by the core power supply domain is higher than or equal to the threshold voltage, it may be determined that the core power supply of the first chip is in a normal working state, and the method provided in this embodiment of the present disclosure may further include the following steps: determining whether a voltage output by the I/O power supply domain is in an unstable working state, if the voltage output by the I/O power supply domain is in the unstable working state, generating a second level signal according to a pull-up resistor and/or a pull-down resistor that are/is disposed on the I/O interface, where the second level signal is used to enable the second chip to be in the ignoring state after the second chip receives the second level signal, and sending the generated second level signal to the second chip such that the second chip enters the ignoring state, where after entering the ignoring state, the second chip ignores the control signal and the data signal that are sent by the first chip.

In some embodiments of the present disclosure, the second level signal is one signal of a second high level signal and a second low level signal, and the generating a second level signal according to a pull-up resistor and/or a pull-down resistor that are/is disposed on the I/O interface includes, if a pull-up resistor is disposed on the I/O interface, outputting, using a resistor control circuit, a PUC signal to the pull-up resistor in order to obtain the second high level signal using the pull-up resistor, and if a pull-down resistor is disposed on the I/O interface, outputting, using the resistor control circuit, a PDC signal to the pull-down resistor in order to obtain the second low level signal using the pull-down resistor.

The determining whether a voltage output by the power supply domain is in an unstable working state is implemented by setting an I/O threshold. That is, when the voltage output by the I/O power supply domain is lower than the I/O threshold, it indicates that the I/O power supply domain is in the unstable working state, and otherwise, when the voltage output by the I/O power supply domain is higher than or equal to the I/O threshold, it indicates that the I/O power supply domain is in a stable working state.

In this embodiment of the present disclosure, when the voltage output by the I/O power supply domain of the first chip is in the unstable working state, the first chip is in a metastable state and causes an impact to the second chip. In this embodiment of the present disclosure, this technical problem may also be solved by integrating a pull-up resistor and/or a pull-down resistor on the I/O interface of the first chip. Resistance values of the pull-up resistor and/or the pull-down resistor integrated on the I/O interface indicate resistance at a kilo-ohm level. According to the pull-up resistor and/or the pull-down resistor, the second high level signal or the second low level signal is output to the second chip. The second level signal is used to enable the second chip to be in the ignoring state after the second chip receives the second level signal, which can avoid the impact of the metastable state of the first chip on the second chip. Selection of its resistance value is not further limited so long as it can drive the second chip.

In some embodiments of the present disclosure, if the voltage output by the core power supply domain is higher than or equal to the threshold voltage, and the voltage output by the I/O power supply domain is in a stable working state, the method provided in this embodiment of the present disclosure may further include, if a PD signal is output in the core power supply domain, triggering, according to the PD signal, a PDC signal output by a resistor control circuit such that the PDC signal controls the pull-down resistor to be in a non-working state, and if a PU signal is output in the core power supply domain, triggering, according to the PU signal, a PUC signal output by the resistor control circuit such that the PUC signal controls the pull-up resistor to be in a non-working state.

If a pull-down resistor is disposed on the I/O interface of the first chip, a PD signal is output in the core power supply domain, and a PDC signal output using the resistor control circuit is driven according to the PD signal such that the PDC signal controls the pull-down resistor to be in a non-working state. It can be seen that, when the core power supply domain is in a normal working state, a pull-down function of the pull-down resistor is invalidated by invalidating the PD signal, that is, the pull-down resistor no longer works, which can reduce power consumption of the first chip.

In some embodiments of the present disclosure, if a pull-up resistor is disposed on the I/O interface of the first chip, a PU signal is output in the core power supply domain, and a PUC signal output using the resistor control circuit is driven according to the PU signal such that the PUC signal controls the pull-up resistor to be in a non-working state. It can be seen that, when the core power supply domain is in a normal working state, a pull-up function of the pull-up resistor is invalidated by invalidating the PU signal, that is, the pull-up resistor no longer works, which can reduce power consumption of the first chip.

In the prior art, with a sending chip used as an example, power consumption of a system increases when a resistor is disposed on a board. A pull-up resistor or pull-down resistor that is disposed on the board is mainly configured to provide a correct state for an input end of a receiving end when the sending chip is in a metastable state. However, when the sending chip is in a normal state, unnecessary current overheads exist for the pull-up resistor or pull-down resistor that is disposed on the board. In this embodiment of the present disclosure, however, in order to solve this problem, the method provided in this embodiment of the present disclosure may be further used to control invalidation of a pull-up function of a pull-up resistor, and/or control invalidation of a pull-down function of a pull-down resistor. In this embodiment of the present disclosure, in order to decrease power consumption of a current, a function control signal is provided for a pull-up resistor and/or a pull-down resistor integrated on a first chip. When the core power supply is in a stable working state and a voltage output by an I/O power supply domain of the first chip is in a normal working state, the control signal is used to control functions of the pull-up resistor and/or the pull-down resistor to be invalid, that is, the pull-up resistor and/or the pull-down resistor are/is in a non-working state, and therefore power consumption of the first chip does not increase.

As can be known from the foregoing embodiment, first, a voltage value output by a core power supply domain is compared with a preset threshold voltage of a first chip. When the voltage output by the core power supply domain is lower than the threshold voltage, it may be learnt that a core power supply is still unstable and the first chip is abnormal. Then, a first level signal is generated according to a control function of the first chip over a second chip, where the first level signal is used to enable the second chip to be in an ignoring state after the second chip receives the first level signal. Finally, the first level signal is sent to the second chip through an I/O interface. In this embodiment of the present disclosure, when a voltage output by a core power supply domain is lower than a threshold voltage, a first level signal is generated according to a control function of a first chip over a second chip. The first level signal output by the first chip can enable the second chip to be in an ignoring state. After receiving the first level signal, the second chip enters the ignoring state. After entering the ignoring state, the second chip ignores a control signal and a data signal that are sent by the first chip, thereby preventing a misoperation caused by the first chip to the second chip.

Figure 4:
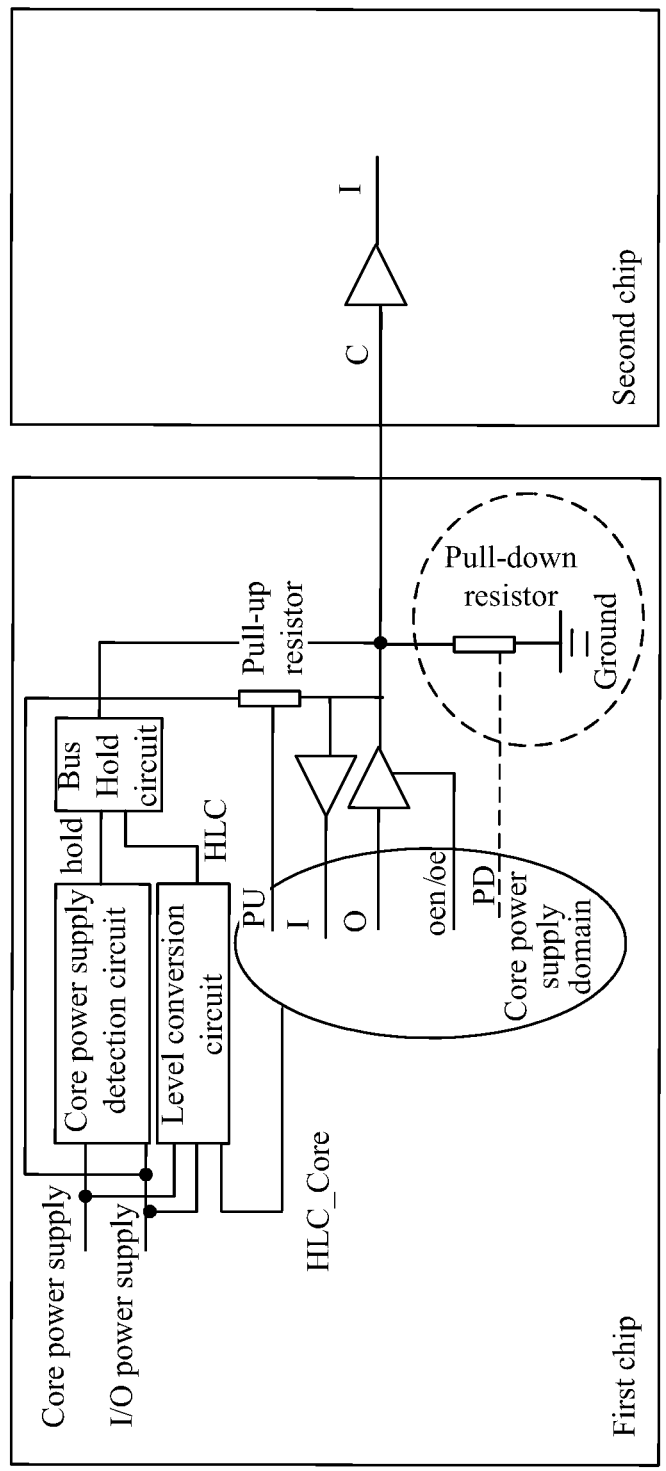
FIG. 4 is a schematic diagram of an implementation manner of an I/O interface-based signal output method according to an embodiment of the present disclosure.

To describe in detail this embodiment provided in the present disclosure, refer to an application scenario shown in FIG. 4, where description is given using an I/O interface of a first chip as an example. FIG. 4 shows only an implementation manner on the I/O interface of the first chip, and likewise, a same layout manner may also be used for a second chip, which is for description only herein.

In FIG. 4, a core power supply detection circuit is disposed on both a core power supply and an I/O power supply. The core power supply detection circuit is connected to a bus hold circuit, both a pull-up resistor and a pull-down resistor (represented using a dotted line in FIG. 4) are disposed on the I/O power supply. A core power supply domain outputs a PU signal to the pull-up resistor and outputs a PD signal to the pull-down resistor. An HLC-Core signal output in the core power supply domain is input into a level conversion circuit, oen/oe is a control signal of the core power supply domain, and an I/O interface is disposed on a first chip. First, the core power supply detection circuit detects an output voltage of the core power supply domain, determines whether the output voltage is lower than a threshold voltage of the first chip, and sends a hold signal when the output voltage is lower than the threshold voltage of the first chip. Then, the bus hold circuit is started. If a control function of the first chip over a second chip is controlling, using a high level signal, the second chip to enter a working state, a first low level signal is generated for the second chip according to the disposed pull-down resistor, and the first low level signal is sent to the second chip through the I/O interface. If a control function of the first chip over a second chip is controlling, using a low level signal, the second chip to enter a working state, a first high level signal is generated for the second chip according to the disposed pull-up resistor, and the first high level signal is sent to the second chip through the I/O interface. If a pull-up resistor and a pull-down resistor are disposed on the I/O interface of the first chip, an HLC-Core signal is output in the core power supply domain according to the control function of the first chip over the second chip; level conversion is performed on the HLC-Core signal using the level conversion circuit, to obtain an HLC signal, and a first level signal is generated for the second chip by the bus hold circuit according to the HLC signal, where if the HLC signal indicates a high level, the bus hold circuit outputs the first high level signal, and if the HLC signal indicates a low level, the bus hold circuit outputs the first low level signal.

Figure 5:
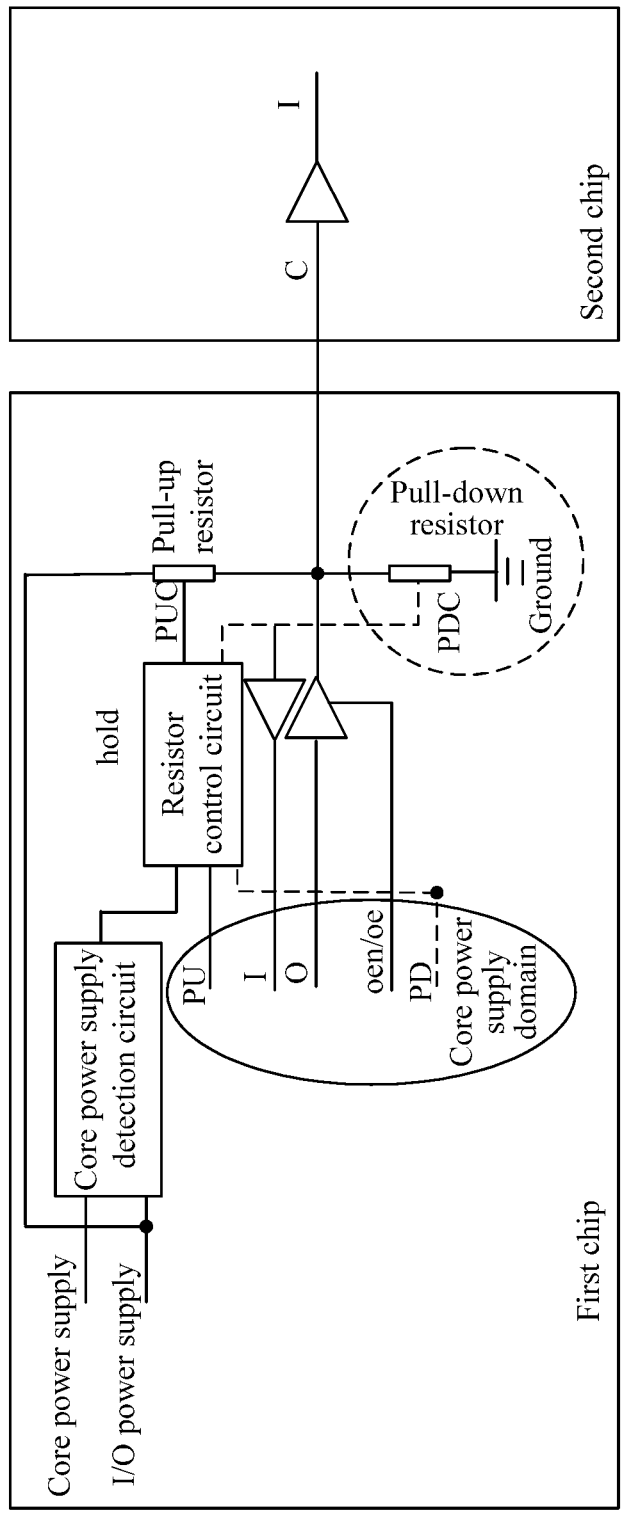
FIG. 5 is a schematic diagram of another implementation manner of an I/O interface-based signal output method according to an embodiment of the present disclosure.

It should be noted that, in this embodiment of the present disclosure, when the voltage output by the core power supply domain is lower than the threshold voltage, the outputting a first level signal to the second chip according to a pull-up resistor and/or a pull-down resistor that are/is integrated on the I/O interface may also be implemented using another manner apart from using the bus hold circuit. For example, the outputting a first level signal to the second chip according to a pull-up resistor and/or a pull-down resistor that are/is integrated on the I/O interface may also be implemented using a resistor control circuit. The resistor control circuit is configured to generate, when the core power supply is in an unstable state, a control signal to control the pull-up resistor and/or the pull-down resistor that are/is integrated on the I/O interface such that the pull-up resistor and/or the pull-down resistor that are/is integrated on the I/O interface work(s), and that an I/O power supply domain outputs the first level signal and then sends the first level signal to the second chip. The resistor control circuit is configured to determine, according to a resistor control value, the first level signal that is output to the second chip. To describe in detail this embodiment provided in the present disclosure, refer to an application scenario shown in FIG. 5, where description is given using an I/O interface of a first chip as an example. FIG. 5 shows only an implementation manner on the I/O interface of the first chip, and likewise, a same layout manner may also be used for a second chip, which is for description only herein.

In FIG. 5, a core power supply detection circuit is disposed on both a core power supply and an I/O power supply. The core power supply detection circuit is connected to a resistor control circuit, both a pull-up resistor and a pull-down resistor (represented using a dotted line in FIG. 5) are disposed on the I/O power supply, a core power supply domain outputs a PU signal to the resistor control circuit and the resistor control circuit outputs a PUC signal to the pull-up resistor. The core power supply domain outputs a PD signal to the resistor control circuit and the resistor control circuit outputs a PDC signal to the pull-down resistor, oen/oe is a control signal of the core power supply domain, and an I/O interface is disposed on a first chip. First, the core power supply detection circuit detects an output voltage of the core power supply domain, determines whether the output voltage is lower than a threshold voltage of the first chip, and sends a hold signal when the output voltage is lower than the threshold voltage of the first chip. Then the resistor control circuit is started. If a control function of the first chip over a second chip is controlling, using a high level signal, the second chip to enter a working state, a PDC signal is output using the resistor control circuit. The PDC signal is output to the disposed pull-down resistor, and the pull-down resistor outputs a first low level signal. If a control function of the first chip over a second chip is controlling, using a low level signal, the second chip to enter a working state, a PUC signal is output using the resistor control circuit. The PUC signal is output to the disposed pull-up resistor, and the pull-up resistor outputs a first high level signal. If a pull-up resistor and a pull-down resistor are disposed on the I/O interface of the first chip, a PUC signal and a PDC signal that are generated by the resistor control circuit are determined by a PU signal and a PD signal that are provided inside the first chip. If a PU signal is generated inside the first chip, the resistor control circuit is triggered to generate a PUC signal, and if a PD signal is generated inside the first chip, the resistor control circuit is triggered to generate a PDC signal. The following specific description is provided according to different resistors integrated on the I/O interface, if a pull-up resistor and a pull-down resistor are integrated on the I/O interface, whether the resistor control circuit generates a PUC or PDC signal is determined by the control function of the first chip over the second chip, and if a PUC signal is generated, a first high level signal is generated, and if a PDC signal is generated, a first low level signal is generated, if only a pull-up resistor is integrated on the I/O interface, the resistor control circuit generates a PUC signal and outputs a first high level signal to the second chip, and if only a pull-down resistor is integrated on the I/O interface, the resistor control circuit generates a PDC signal and outputs a first low level signal to the second chip.

In this embodiment provided in the present disclosure, first, a voltage value output by a core power supply domain is compared with a preset threshold voltage of a first chip are compared. When the voltage output by the core power supply domain is lower than the threshold voltage, it may be learnt that a core power supply is still unstable and the first chip is abnormal. Then, a first level signal is generated according to a control function of the first chip over a second chip, which may be implemented using a bus hold circuit or a resistor control circuit, where the first level signal is used to enable the second chip to be in an ignoring state after the second chip receives the first level signal. Finally, the first level signal is sent to the second chip through an I/O interface. In this embodiment of the present disclosure, when a voltage output by a core power supply domain is lower than a threshold voltage, a first level signal is generated according to a control function of a first chip over a second chip. The first level signal output by the first chip can enable the second chip to be in an ignoring state. After receiving the first level signal, the second chip enters the ignoring state. After entering the ignoring state, the second chip ignores a control signal and a data signal that are sent by the first chip, thereby preventing a misoperation caused by the first chip to the second chip.

It should be noted that, for ease of description, the aforementioned method embodiments are all described as a combination of a series of actions, but a person skilled in the art shall know that the present disclosure is not limited to the described order of actions because some steps, according to the present disclosure, may be performed in other order or concurrently. In addition, a person skilled in the art shall also know that the embodiments described in the specification are exemplary embodiments and the involved actions and modules are not necessarily mandatory for the present disclosure.

The foregoing embodiments describe an I/O interface-based signal output method provided in the present disclosure. The following describes an I/O interface-based signal output apparatus provided in an embodiment of the present disclosure. The apparatus completely corresponds to the method described in the aforementioned embodiments. In an actual application, the I/O interface-based signal output apparatus provided in this embodiment of the present disclosure may be further built in a first chip, and I/O interface-based signal output is implemented by means of software or hardware integration. In this embodiment of the present disclosure, an apparatus corresponding to the method described in the foregoing method embodiments is described. Further, for executing methods of units, reference may be made to the foregoing method embodiments. Only content of relevant units is described herein. The following provides specific description.

Figure 6A:
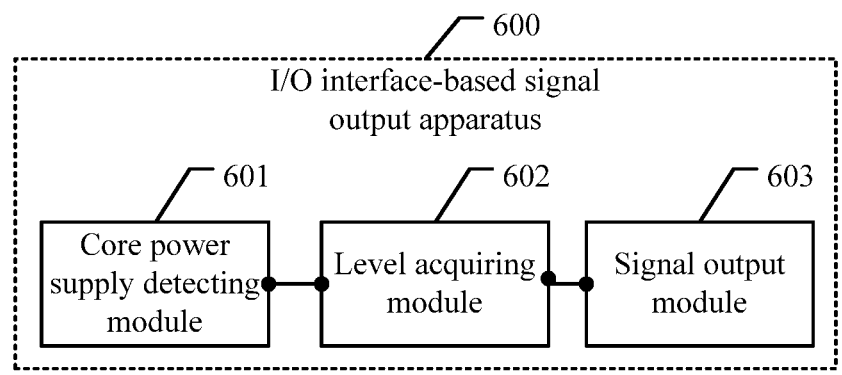
FIG. 6A is a schematic diagram of compositional modules of an I/O interface-based signal output apparatus according to an embodiment of the present disclosure.

FIG. 6A shows an I/O interface-based signal output apparatus 600 provided in an embodiment of the present disclosure, where the apparatus 600 is applied in a first chip, a core power supply domain is provided for the first chip, and the first chip is communicatively connected to a second chip. The signal output apparatus 600 includes a core power supply detecting module 601, a level acquiring module 602, and a signal output module 603, where the core power supply detecting module 601 is configured to determine whether a voltage output by the core power supply domain is lower than a preset threshold voltage of the first chip. The level acquiring module 602 is configured to, if the voltage output by the core power supply domain is lower than the threshold voltage, generate a first level signal according to a control function of the first chip over the second chip, where the first level signal is used to enable the second chip to be in an ignoring state after the second chip receives the first level signal, and the signal output module 603 is configured to acquire the first level signal from the level acquiring module, and send the first level signal to the second chip through the I/O interface such that the second chip enters the ignoring state, where after entering the ignoring state, the second chip ignores a control signal and a data signal that are sent by the first chip.

It should be noted that, in some embodiments of the present disclosure, the level acquiring module 602 is further configured to generate the first level signal using a pull-up resistor or pull-down resistor that is disposed on the I/O interface.

Figure 6B:
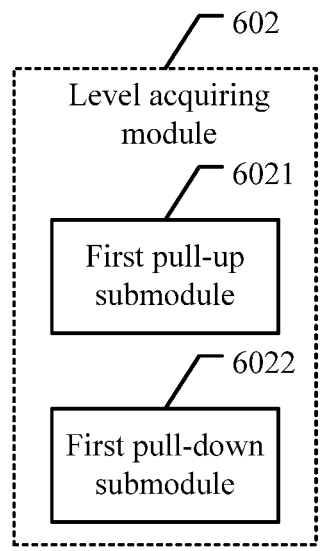
FIG. 6B is a schematic diagram of compositional modules of a level acquiring module according to an embodiment of the present disclosure.

Furthermore, in some other embodiments of the present disclosure, in one implementable manner, as shown in FIG. 6B, the level acquiring module 602 may include a first pull-up submodule 6021 configured to, if a pull-up resistor is disposed on the I/O interface, output, using a resistor control circuit, a PUC signal to the pull-up resistor in order to obtain a first high level signal using the pull-up resistor, and a first pull-down submodule 6022 configured to, if a pull-down resistor is disposed on the I/O interface, output, using the resistor control circuit, a PDC signal to the pull-down resistor in order to obtain a first low level signal using the pull-down resistor.

Figure 6C:
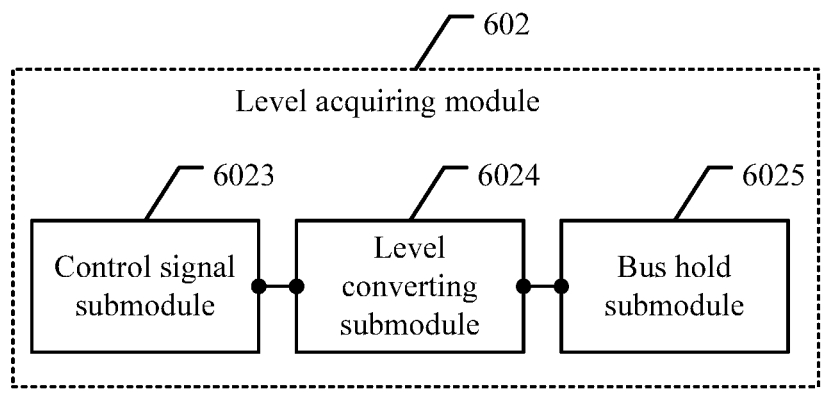
FIG. 6C is a schematic diagram of compositional modules of another level acquiring module according to an embodiment of the present disclosure.

In some other embodiments of the present disclosure, the first level signal is one signal of a first high level signal and a first low level signal. If a pull-up resistor and a pull-down resistor are disposed on the I/O interface of the first chip, in another implementable manner, as shown in FIG. 6C, the level acquiring module 602 may include, a control signal submodule 6023 configured to generate, using the core power supply domain, a HLC-Core signal corresponding to the control function of the first chip over the second chip; a level converting submodule 6024 configured to perform level conversion on the HLC-Core signal to obtain a HLC signal, and a bus hold submodule 6025 configured to generate, using a bus hold circuit, the first level signal according to the HLC signal, where if the HLC signal indicates a high level, the bus hold circuit outputs the first high level signal, and if the HLC signal indicates a low level, the bus hold circuit outputs the first low level signal.

Figure 6D:
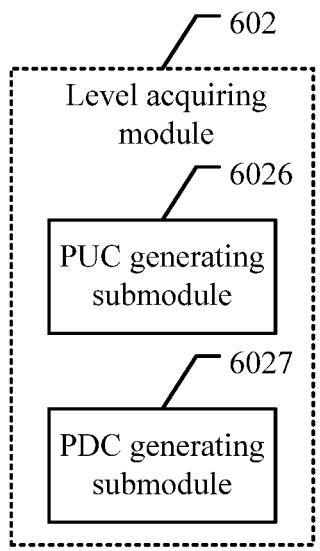
FIG. 6D is a schematic diagram of compositional modules of another level acquiring module according to an embodiment of the present disclosure.

In some other embodiments of the present disclosure, the first level signal is one signal of a first high level signal and a first low level signal. If a pull-up resistor and a pull-down resistor are disposed on the I/O interface of the first chip, in another implementable manner, as shown in FIG. 6D, the level acquiring module 602 may include, a PUC generating submodule 6026 configured to, according to the control function of the first chip over the second chip, if a PUC signal is generated using a resistor control circuit, output the PUC signal to the pull-up resistor such that the pull-up resistor outputs the first high level signal, and a PDC generating submodule 6027 configured to, according to the control function of the first chip over the second chip, if a PDC signal is generated using the resistor control circuit, output the PDC signal to the pull-down resistor such that the pull-down resistor outputs the first low level signal.

Figure 6E:
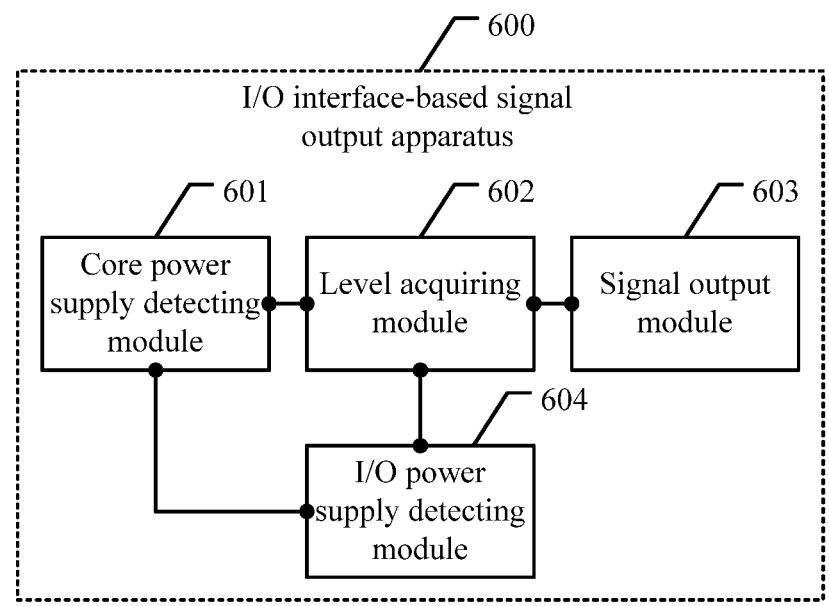
FIG. 6E is a schematic diagram of compositional modules of another I/O interface-based signal output apparatus according to an embodiment of the present disclosure.

It should be noted that, for the I/O interface-based signal output apparatus 600 provided in this embodiment of the present disclosure, if the voltage output by the core power supply domain is higher than or equal to the threshold voltage, in one implementable manner, as shown in FIG. 6E, the signal output apparatus 600 further includes an I/O power supply detecting module 604, where the I/O power supply detecting module 604 is configured to determine whether a voltage output by an I/O power supply domain is in an unstable working state. The level acquiring module 602 is further configured to, if the voltage output by the I/O power supply domain is in the unstable working state, generate a second level signal according to a pull-up resistor and/or a pull-down resistor that are/is disposed on the I/O interface, where the second level signal is used to enable the second chip to be in the ignoring state after the second chip receives the second level signal, and the signal output module 603 is further configured to send the generated second level signal to the second chip such that the second chip enters the ignoring state, where after entering the ignoring state, the second chip ignores the control signal and the data signal that are sent by the first chip.

Figure 6F:
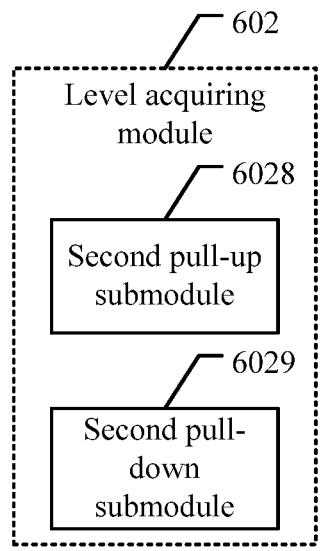
FIG. 6F is a schematic diagram of compositional modules of another level acquiring module according to an embodiment of the present disclosure.

In some other embodiments of the present disclosure, in another implementable manner, as shown in FIG. 6F, the level acquiring module 602 may include a second pull-up submodule 6028 configured to, if a pull-up resistor is disposed on the I/O interface, output, using a resistor control circuit, a PUC signal to the pull-up resistor in order to obtain a second high level signal using the pull-up resistor, and a second pull-down submodule 6029 configured to, if a pull-down resistor is disposed on the I/O interface, output, using the resistor control circuit, a PDC signal to the pull-down resistor in order to obtain a second low level signal using the pull-down resistor.

Figure 6G:
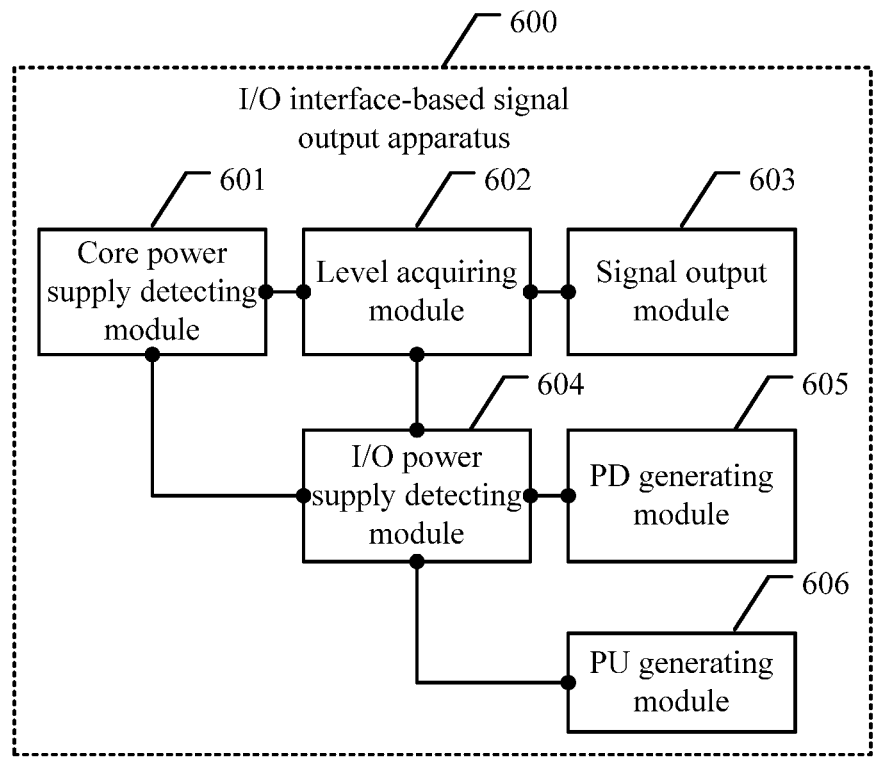
FIG. 6G is a schematic diagram of compositional modules of another I/O interface-based signal output apparatus according to an embodiment of the present disclosure.

It should be noted that, for the signal output apparatus 600 shown in FIG. 6E, if the voltage output by the I/O power supply domain is in a stable working state, in one implementable manner, as shown in FIG. 6G, in addition to including the I/O power supply detecting module 604, the signal output apparatus 600 further includes a PD generating module 605 configured to, if a PD signal is output in the core power supply domain, trigger, according to the PD signal, a PDC signal output by a resistor control circuit such that the PDC signal controls the pull-down resistor to be in a non-working state, and a PU generating module 606 configured to, if a PU signal is output in the core power supply domain, trigger, according to the PU signal, a PUC signal output by the resistor control circuit such that the PUC signal controls the pull-up resistor to be in a non-working state.

Figure 6H:
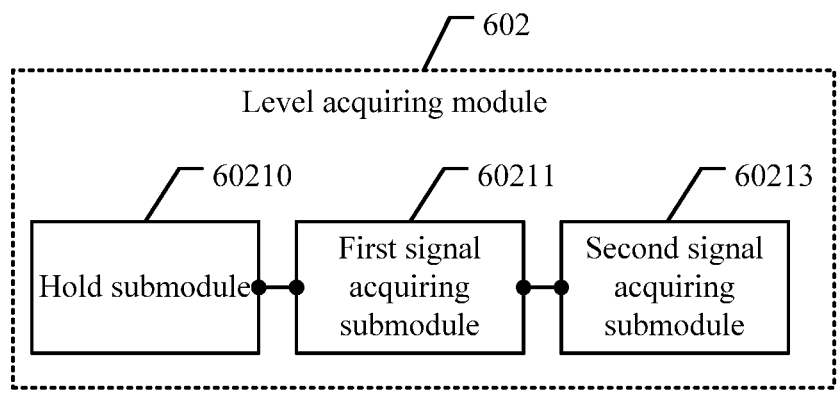
FIG. 6H is a schematic diagram of compositional modules of another level acquiring module according to an embodiment of the present disclosure.

In some other embodiments of the present disclosure, in another implementable manner, as shown in FIG. 6H, the level acquiring module 602 may include a hold submodule 60210 configured to send a hold signal; a first signal acquiring submodule 60211 configured to acquire a first signal output by the I/O interface before the hold signal is sent, and a second signal acquiring submodule 60213 configured to generate, for the second chip, a second signal whose level is kept reverse to a level of the first signal, where the second signal is the generated first level signal.

In this embodiment of the present disclosure, first, a core power supply detecting module compares a voltage value output by a core power supply domain with a preset threshold voltage of a first chip. When the voltage output by the core power supply domain is lower than the threshold voltage, it may be learnt that a core power supply is still unstable and the first chip is abnormal. Then, a level acquiring module generates a first level signal according to a control function of the first chip over a second chip, where the first level signal is used to enable the second chip to be in an ignoring state after the second chip receives the first level signal. Finally, a signal output module sends the first level signal to the second chip using an I/O interface. In this embodiment of the present disclosure, when a voltage output by a core power supply domain is lower than a threshold voltage, a first level signal is generated according to a control function of a first chip over a second chip. The first level signal output by the first chip can enable the second chip to be in an ignoring state. When being in the ignoring state, the second chip ignores a control signal and a data signal that are sent by the first chip, thereby preventing a misoperation caused by the first chip to the second chip.

In a possible implementation, the signal output apparatus involved in this embodiment of the present disclosure and the units or modules in the signal output apparatus may be implemented by means of an integrated circuit technique. For example, the signal output apparatus may be integrated into the first chip as a whole and serves as a part of the first chip. Certainly, some units or modules in the signal output apparatus may be coupled to the first chip in a form of separate devices, which is not limited in this embodiment.

Figure 7:
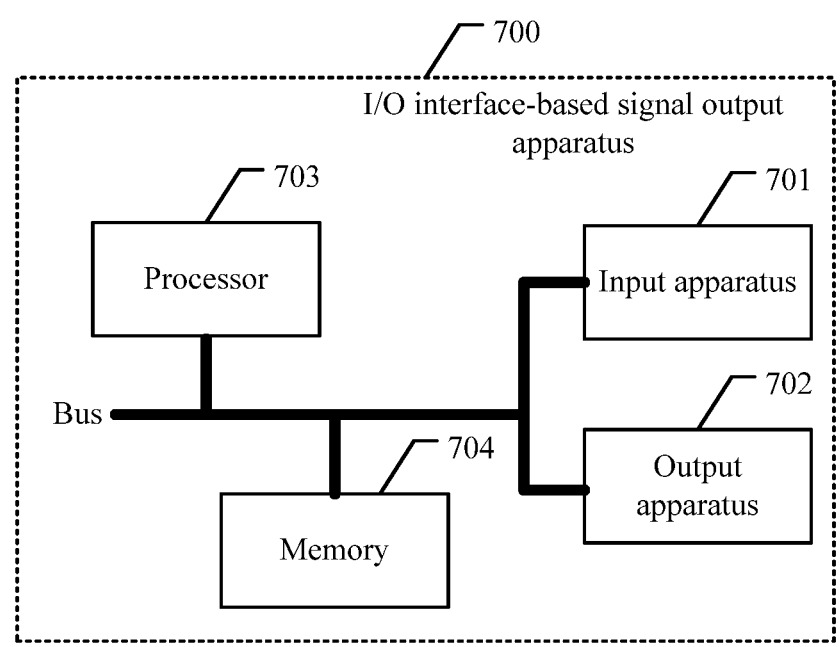
FIG. 7 is a schematic diagram of compositional modules of another I/O interface-based signal output apparatus according to an embodiment of the present disclosure.

The following describes another I/O interface-based signal output apparatus provided in an embodiment of the present disclosure, where the I/O interface is disposed in a first chip, a core power supply domain is provided for the first chip, and the first chip is communicatively connected to a second chip. Referring to FIG. 7, an I/O interface-based signal output apparatus 700 includes an input apparatus 701, an output apparatus 702, a processor 703, and a memory 704 (there may be one or more processors 703 in the signal output apparatus 700, and one processor is used as an example in FIG. 7). In some embodiments of the present disclosure, the input apparatus 701, the output apparatus 702, the processor 703, and the memory 704 may be connected using a bus or in another manner. The memory 704 is configured to store at least one of instructions and data that are required by the processor 703. In FIG. 7, a connection using a bus is used as an example. In a possible implementation, the signal output apparatus 700 may be integrated into a first chip.

The input apparatus 701 is configured to input a voltage output by a core power supply domain into the processor 703.

The processor 703 is configured to perform the following steps: determining whether the voltage output by the core power supply domain is lower than a threshold voltage of a first chip, if the voltage output by the core power supply domain is lower than the threshold voltage, generating a first level signal according to a control function of the first chip over a second chip, where the first level signal is used to enable the second chip to be in an ignoring state after the second chip receives the first level signal, and sending the first level signal to the second chip through the I/O interface such that the second chip enters the ignoring state, where after entering the ignoring state, the second chip ignores a control signal and a data signal that are sent by the first chip.

The output apparatus 702 is configured to output the first level signal to the second chip through the I/O interface.

In some embodiments of the present disclosure, the processor 703 may be further configured to perform the following step of generating the first level signal using a pull-up resistor or pull-down resistor that is disposed on the I/O interface.

In some embodiments of the present disclosure, the first level signal is one signal of a first high level signal and a first low level signal, and the processor 703 may be further configured to perform the following steps: if a pull-up resistor is disposed on the I/O interface, outputting, using a resistor control circuit, a PUC signal to the pull-up resistor in order to obtain the first high level signal using the pull-up resistor; and if a pull-down resistor is disposed on the I/O interface, outputting, using the resistor control circuit, a PDC signal to the pull-down resistor in order to obtain the first low level signal using the pull-down resistor.

In some embodiments of the present disclosure, the first level signal is one signal of a first high level signal and a first low level signal, and if a pull-up resistor and a pull-down resistor are disposed on the I/O interface of the first chip, the processor 703 may be further configured to perform the following steps: generating, using the core power supply domain, a HLC-Core signal corresponding to the control function of the first chip over the second chip, performing level conversion on the HLC-Core signal to obtain a HLC signal, and generating, using a bus hold circuit, the first level signal according to the HLC signal, where if the HLC signal indicates a high level, the bus hold circuit outputs the first high level signal, and if the HLC signal indicates a low level, the bus hold circuit outputs the first low level signal.

In some embodiments of the present disclosure, the first level signal is one signal of a first high level signal and a first low level signal, and if a pull-up resistor and a pull-down resistor are disposed on the I/O interface of the first chip, the processor 703 is further configured to perform the following steps: according to the control function of the first chip over the second chip, if a PUC signal is generated using a resistor control circuit, outputting the PUC signal to the pull-up resistor such that the pull-up resistor outputs the first high level signal, and according to the control function of the first chip over the second chip, if a PDC signal is generated using the resistor control circuit, outputting the PDC signal to the pull-down resistor such that the pull-down resistor outputs the first low level signal.

In some embodiments of the present disclosure, if the voltage output by the core power supply domain is higher than or equal to the threshold voltage, the processor 703 is further configured to perform the following steps: determining whether a voltage output by an I/O power supply domain is in an unstable working state, if the voltage output by the I/O power supply domain is in the unstable working state, generating a second level signal according to a pull-up resistor and/or a pull-down resistor that are/is disposed on the I/O interface, where the second level signal is used to enable the second chip to be in the ignoring state after the second chip receives the second level signal, and sending the generated second level signal to the second chip such that the second chip enters the ignoring state, where after entering the ignoring state, the second chip ignores the control signal and the data signal that are sent by the first chip.

In some embodiments of the present disclosure, the second level signal is one signal of a second high level signal and a second low level signal, and the processor 703 is further configured to perform the following steps: if a pull-up resistor is disposed on the I/O interface, outputting, using a resistor control circuit, a PUC signal to the pull-up resistor in order to obtain the second high level signal using the pull-up resistor; and if a pull-down resistor is disposed on the I/O interface, outputting, using the resistor control circuit, a PDC signal to the pull-down resistor in order to obtain the second low level signal using the pull-down resistor.

In some embodiments of the present disclosure, if the voltage output by the I/O power supply domain is in a stable working state, the processor 703 is further configured to perform the following steps: if a PD signal is output in the core power supply domain, triggering, according to the PD signal, a PDC signal output by a resistor control circuit such that the PDC signal controls the pull-down resistor to be in a non-working state, and if a PU signal is output in the core power supply domain, triggering, according to the PU signal, a PUC signal output by the resistor control circuit such that the PUC signal controls the pull-up resistor to be in a non-working state.

In some embodiments of the present disclosure, the processor 703 is further configured to perform the following steps: sending a hold signal, acquiring a first signal output by the I/O interface before the hold signal is sent, and generating, for the second chip, a second signal whose level is kept reverse to a level of the first signal, where the second signal is the generated first level signal.

In conclusion, first, a voltage value output by a core power supply domain is compared with a preset threshold voltage of a first chip. When the voltage output by the core power supply domain is lower than the threshold voltage, it may be learnt that a core power supply is still unstable and the first chip is abnormal. Then, a first level signal is generated according to a control function of the first chip over a second chip, where the first level signal is used to enable the second chip to be in an ignoring state after the second chip receives the first level signal. Finally, the first level signal is sent to the second chip through an I/O interface. In this embodiment of the present disclosure, when a voltage output by a core power supply domain is lower than a threshold voltage, a first level signal is generated according to a control function of a first chip over a second chip. The first level signal output by the first chip can enable the second chip to be in an ignoring state. After receiving the first level signal, the second chip enters the ignoring state. After entering the ignoring state, the second chip ignores a control signal and a data signal that are sent by the first chip, thereby preventing a misoperation caused by the first chip to the second chip.

A person of ordinary skill in the art may understand that all or a part of the steps of the methods in the embodiments may be implemented by a program instructing relevant hardware. The program may be stored in a computer readable storage medium. The storage medium may include a read-only memory, a magnetic disk, or an optical disc.

The foregoing describes in detail the I/O interface-based signal output method and apparatus provided in the present disclosure. A person of ordinary skill in the art may make changes to the specific implementation manners and the application scope based on the idea of the embodiments of the present disclosure. In conclusion, the content in this specification shall not be understood as a limitation to the present disclosure.

What is claimed is:

1. An input/output (I/O) interface-based signal output method, the I/O interface being disposed in a first chip, a core power supply domain being provided for the first chip, the first chip being communicatively coupled to a second chip, and the signal output method comprising:
    determining whether a voltage output by the core power supply domain is less than or greater than a preset threshold voltage of the first chip, the voltage output by the core power supply domain being less than the preset threshold voltage of the first chip in response to the core power supply domain being turned-on or turned-off, the voltage output by the core power supply domain being less than the preset threshold voltage of the first chip indicating that the first chip is in an unstable state and generates abnormal data, and the voltage output by the core power supply domain being greater than the preset threshold voltage of the first chip indicating that the first chip is in a stable state;
    generating a first level signal based on a level of a signal used to control the second chip by the first chip in response to the voltage output by the core power supply domain being less than the threshold voltage, the first level signal comprising a first low level signal that enables the second chip to be in an ignoring state after the second chip receives the first level signal;
    sending the first level signal to the second chip through the I/O interface to enable the second chip to enter the ignoring state, the ignoring state being used to indicate that the second chip ignores control and data signals sent by the first chip to the second chip; and
    generating a second level signal based on the level of the signal used to control the second chip by the first chip in response to the voltage output by the core power supply domain being greater than the threshold voltage, the second level signal comprising a first high level signal that enables the second chip to be in a working state after the second chip receives the first level signal.

2. The method according to claim 1, wherein generating the first level signal according to the control function of the first chip over the second chip comprises generating the first level signal using a pull-up resistor or a pull-down resistor that is disposed on the I/O interface.

3. The method according to claim 2, wherein generating the first level signal using the pull-up resistor or the pull-down resistor that is disposed on the I/O interface comprises:
outputting, using a resistor control circuit, a pull-up control (PUC) signal to the pull-up resistor in order to obtain the first high level signal using the pull-up resistor in response to the pull-up resistor being disposed on the I/O interface; and
outputting, using the resistor control circuit, a pull-down control (PDC) signal to the pull-down resistor in order to obtain the first low level signal using the pull-down resistor in response to the pull-down resistor being disposed on the I/O interface.

4. The method according to claim 1, wherein a pull-up resistor and a pull-down resistor are disposed on the I/O interface of the first chip, generating the first level signal according to the control function of the first chip over the second chip comprises:
generating, using the core power supply domain, a high low control-core (HLC-Core) signal corresponding to the control function of the first chip over the second chip;
performing level conversion on the HLC-Core signal to obtain a high low control (HLC) signal; and
generating, using a bus hold circuit, the first level signal according to the HLC signal, the bus hold circuit outputting the first high level signal in response to the HLC signal indicating a high level, and the bus hold circuit outputting the first low level signal in response to the HLC signal indicating a low level.

5. The method according to claim 1, wherein a pull-up resistor and a pull-down resistor are disposed on the I/O interface of the first chip, generating the first level signal according to the control function of the first chip over the second chip comprises:
outputting a pull-up control (PUC) signal to the pull-up resistor such that the pull-up resistor outputs the first high level signal, according to the control function of the first chip over the second chip, in response to the PUC signal being generated using a resistor control circuit; and
outputting a pull-down control (PDC) signal to the pull-down resistor such that the pull-down resistor outputs the first low level signal, according to the control function of the first chip over the second chip, in response to the PDC signal being generated using the resistor control circuit.

6. The method according to claim 1, wherein generating the first level signal according to the control function of the first chip over the second chip comprises:
sending a hold signal;
acquiring a first signal output by the I/O interface before the hold signal is sent; and
generating, for the second chip in response to the hold signal, a second signal whose level is kept reverse to a level of the first signal, the second signal comprising the generated first level signal.

7. The method according to claim 1, wherein the voltage output by the core power supply domain is greater than or equal to the threshold voltage, the signal output method further comprises:
determining whether a voltage output by an I/O power supply domain is in an unstable working state;
generating the second level signal according to a pull-up resistor or a pull-down resistor that is disposed on the I/O interface in response to the voltage output by the I/O power supply domain being in the unstable working state, the second level signal enabling the second chip to be in the ignoring state after the second chip receives the second level signal; and
sending the generated second level signal to the second chip to enable the second chip to enter the ignoring state.

8. The method according to claim 7, wherein generating the second level signal according to the pull-up resistor or the pull-down resistor that is disposed on the I/O interface comprises:
outputting, using a resistor control circuit, a pull-up control (PUC) signal to the pull-up resistor in order to obtain the second high level signal using the pull-up resistor in response to the pull-up resistor being disposed on the I/O interface; and
outputting, using the resistor control circuit, a pull-down control (PDC) signal to the pull-down resistor in order to obtain the second low level signal using the pull-down resistor in response to the pull-down resistor being disposed on the I/O interface.

9. The method according to claim 7, wherein the voltage output by the I/O power supply domain is in a stable working state, the signal output method further comprises:
triggering, according to a pull-down (PD) signal, a pull-down control (PDC) signal output by a resistor control circuit such that the PDC signal controls the pull-down resistor to be in a non-working state in response to the PD signal being output in the core power supply domain; and
triggering, according to a pull-up (PU) signal, a pull-up control (PUC) signal output by the resistor control circuit such that the PUC signal controls the pull-up resistor to be in the non-working state in response to the PU signal being output in the core power supply domain.

10. An input/output (I/O) interface-based signal output apparatus, the I/O interface being disposed in a first chip, a core power supply domain being provided for the first chip, the first chip being communicatively coupled to a second chip, and the signal output apparatus comprising:
a memory configured to store instructions; and
a processor coupled to the memory, the instructions causing the processor to be configured to:
determine whether a voltage output by the core power supply domain is less than or greater than a preset threshold voltage of the first chip, the voltage output by the core power supply domain being less than the preset threshold voltage of the first chip in response to the core power supply domain being turned-on or turned-off, the voltage output by the core power supply domain being less than the preset threshold voltage of the first chip indicating that the first chip is in an unstable state and generates abnormal data, and the voltage output by the core power supply domain being greater than the preset threshold voltage of the first chip indicating that the first chip is in a stable state;
generate a first level signal based on a level of a signal used to control the second chip by the first chip in response to the voltage output by the core power supply domain being less than the threshold voltage, the first level signal comprising a first low level signal that enables the second chip to be in an ignoring state after the second chip receives the first level signal;

send the first level signal to the second chip through the I/O interface to enable the second chip to enter the ignoring state, the ignoring state indicating that the second chip ignores control and data signals that are sent by the first chip; and generate a second level signal according to the control function of the first chip over the second chip based on the level of the signal used to control the second chip by the first chip in response to in response to the voltage output by the core power supply domain being greater than the threshold voltage, the second level signal comprising a first high level signal that enables the second chip to be in a working state after the second chip receives the first level signal.

11. The apparatus according to claim 10, wherein the instructions further cause the processor to be configured to generate the first level signal using a pull-up resistor or a pull-down resistor that is disposed on the I/O interface.

12. The apparatus according to claim 11, wherein the instructions further cause the processor to be configured to:
output, using a resistor control circuit, a pull-up control (PUC) signal to the pull-up resistor in order to obtain the first high level signal using the pull-up resistor in response to the pull-up resistor being disposed on the I/O interface; and
output, using the resistor control circuit, a pull-down control (PDC) signal to the pull-down resistor in order to obtain the first low level signal using the pull-down resistor in response to the pull-down resistor being disposed on the I/O interface.

13. The apparatus according to claim 10, wherein a pull-up resistor and a pull-down resistor are disposed on the I/O interface of the first chip, the instructions further cause the processor to be configured to:
generate, using the core power supply domain, a high low control-core (HLC-Core) signal corresponding to the control function of the first chip over the second chip;
perform level conversion on the HLC-Core signal to obtain a high low control (HLC) signal; and
generate, using a bus hold circuit, the first level signal according to the HLC signal, the bus hold circuit outputting the first high level signal in response to the HLC signal indicating a high level, and the bus hold circuit outputting the first low level signal in response to the HLC signal indicating a low level.

14. The apparatus according to claim 10, wherein a pull-up resistor and a pull-down resistor are disposed on the I/O interface of the first chip, the instructions further cause the processor to be configured to:
output a pull-up control (PUC) signal to the pull-up resistor such that the pull-up resistor outputs the first high level signal, according to the control function of the first chip over the second chip, in response to the PUC signal being generated using a resistor control circuit; and
output a pull-down control (PDC) signal to the pull-down resistor such that the pull-down resistor outputs the first low level signal, according to the control function of the first chip over the second chip, in response to the PDC signal being generated using the resistor control circuit.

15. The apparatus according to claim 10, wherein the instructions further cause the processor to be configured to:
send a hold signal;
acquire a first signal output by the I/O interface before the hold signal is sent; and
generate, for the second chip in response to the hold signal, a second signal whose level is kept reverse to a level of the first signal, the second signal comprising the generated first level signal.

16. The apparatus according to claim 10, wherein the voltage output by the core power supply domain is greater than or equal to the threshold voltage, the instructions further cause the processor to be configured to:
determine whether a voltage output by an I/O power supply domain is in an unstable working state;
generate the second level signal according to a pull-up resistor or a pull-down resistor that is disposed on the I/O interface in response to the voltage output by the I/O power supply domain being in the unstable working state, the second level signal enabling the second chip to be in the ignoring state after the second chip receives the second level signal; and
send the generated second level signal to the second chip to enable the second chip to enter the ignoring state.

17. The apparatus according to claim 16, wherein the instructions further cause the processor to be configured to:
output, using a resistor control circuit, a pull-up control (PUC) signal to the pull-up resistor in order to obtain a second high level signal using the pull-up resistor in response to the pull-up resistor being disposed on the I/O interface; and
output, using the resistor control circuit, a pull-down control (PDC) signal to the pull-down resistor in order to obtain a second low level signal using the pull-down resistor in response to the pull-down resistor being disposed on the I/O interface.

18. The apparatus according to claim 16, wherein the voltage output by the I/O power supply domain is in a stable working state, the instructions further cause the processor to be configured to:
trigger, according to a pull-down (PD) signal, a pull-down control (PDC) signal output by a resistor control circuit such that the PDC signal controls the pull-down resistor to be in a non-working state in response to the PD signal being output in the core power supply domain; and
trigger, according to a pull-up (PU) signal, a pull-up control (PUC) signal output by the resistor control circuit such that the PUC signal controls the pull-up resistor to be in the non-working state in response to the PU signal being output in the core power supply domain.

* * * * *

UNITED STATES PATENT AND TRADEMARK OFFICE
CERTIFICATE OF CORRECTION

PATENT NO. : 10,558,258 B2
APPLICATION NO. : 15/056379
DATED : February 11, 2020
INVENTOR(S) : Lijuan Tan It is certified that error appears in the above-identified patent and that said Letters Patent is hereby corrected as shown below:

On the Title Page

Item (56), Other Publications: "CN102998614, May 24, 2016" should read "CN102998614, March 27, 2013"

Page 2, item (56), Other Publications: "CN101251766, Mar. 9, 2016" should read "CN101251766, August 27, 2008"

Page 2, item (56), Other Publications: "CN101414748, Mar. 9, 2016" should read "CN101414748, April 22, 2009"

Page 2, item (56), Other Publications: "CN103490757, Mar. 9, 2016" should read "CN103490757, January 1, 2014"

Page 2, item (56), Other Publications: "201310382053.X, Chinese Office Action dated Apr.5, 2016, 11 pages" should read "201310382053.X, Chinese Office Action dated August 17, 2016, 11 pages"

Page 2, item (56), Other Publications: "201310382053.X, Chinese Office Action dated Aug. 8, 2015, 9 pages" should read "201310382053.X, Chinese Office Action dated August 17, 2015, 9 pages"

Signed and Sealed this
Fifth Day of May, 2020

Andrei Iancu
*Director of the United States Patent and Trademark Office*